(12) United States Patent
Takigami et al.

(10) Patent No.: US 8,633,254 B2
(45) Date of Patent: Jan. 21, 2014

(54) PREPARATION OF GELS DERIVED FROM CARBOXYMETHYL CELLULOSE ALKALI METAL SALT

(75) Inventors: Machiko Takigami, Kiryu (JP); Haruyo Amada, Takasaki (JP); Naotsugu Nagasawa, Takasaki (JP); Toshiaki Yagi, Takasaki (JP); Masao Tamada, Takasaki (JP); Noboru Kasai, Takasaki (JP); Fumio Yoshii, Takasaki (JP); Akihiro Hiroki, Takasaki (JP)

(73) Assignees: Japan Atomic Energy Agency, Ibaraki (JP); Machiko Takigami, Gunma (JP)

( * ) Notice: Subject to any disclaimer, the term of this patent is extended or adjusted under 35 U.S.C. 154(b) by 837 days.

(21) Appl. No.: 11/855,335

(22) Filed: Sep. 14, 2007

(65) Prior Publication Data

US 2008/0070997 A1    Mar. 20, 2008

(30) Foreign Application Priority Data

Sep. 15, 2006   (JP) ................................. 2006-250947
Mar. 19, 2007   (JP) ................................. 2007-070145
Jul. 19, 2007   (JP) ................................. 2007-188845

(51) Int. Cl.
      *C08J 3/02*      (2006.01)
(52) U.S. Cl.
      USPC ......................................... 516/109; 514/781
(58) Field of Classification Search
      USPC .................................................. 516/109
      See application file for complete search history.

(56) References Cited

U.S. PATENT DOCUMENTS

| 4,364,929 A * | 12/1982 | Sasmor et al. ............. 424/78.07 |
| 4,618,491 A * | 10/1986 | Kanematu et al. ............ 514/781 |
| 6,638,538 B1 * | 10/2003 | Hashimoto et al. ........... 424/548 |
| 2005/0005870 A1 * | 1/2005 | Fritter et al. ................... 119/173 |

FOREIGN PATENT DOCUMENTS

| JP | 7-090121 | 4/1995 |
| JP | 9-277421 | 10/1997 |
| JP | 10-251447 | 9/1998 |
| JP | 11-106561 | 4/1999 |
| Jp | 2000-191802 | 7/2000 |
| Jp | 2003-190991 | 7/2003 |
| JP | 2005-263858 | * 9/2005 ................ C08J 3/24 |
| WO | WO 2005/041884 | 5/2005 |

OTHER PUBLICATIONS

Radiation crosslinking of CMC-Na at low dose and its application as substitute for hydrogel, Radiation Physics and Chemistry, vol. 72, Issue 5, Apr. 2005, pp. 635-638.*
H. M. Said et al., Synthesis and characterization of novel gels based on carboxymethyl cellulose/acrylic acid prepared by electron beam irradiation, Reactive & Functional Polymer 61 (2004) 397-404, available online Sep. 28, 2004.*

* cited by examiner

*Primary Examiner* — Ling Choi
*Assistant Examiner* — Chun-Cheng Wang
(74) *Attorney, Agent, or Firm* — Brundidge & Stanger, P.C.

(57) ABSTRACT

A method of preparing a gel from carboxymethyl cellulose alkali metal salt, which is an anionic cellulose derivative, by using acid or acid solution. To increase the strength and the elasticity of a gel, a water-insoluble metal compound or organic reinforcement is added when mixing. The obtained gel is one of environmentally friendly type gels because the raw material is derived from plant.

16 Claims, 11 Drawing Sheets

| CMC | DEGREE OF SUBSTITUTION OF CMC (DEGREE OF ETHERIFICATION) | VISCOSITY (mPa·s) | CMC CONCENTRATION (%) | PHOSPHORIC ACID CONCENTRATION (mol/l) | GEL FRAC-TION (%) | WATER ABSORPTION (g WATER/gGEL) |
|---|---|---|---|---|---|---|
| | MAKER'S DATA | MAKER'S DATA | | | | |
| CMC 1190 | 0.67 | 1610 | 12.8 | 3 | 74.4 | 9.9 |
| CMC 1260 | 0.91 | 107 | 12.8 | 3 | 64.9 | 12.7 |
| CMC 1350 | 1.29 | 229 | 12.8 | 3 | 64.7 | 19.5 |
| CMC 2200 | 0.95 | 1820 | 12.8 | 3 | 72.9 | 10.8 |
| CMC 2260 | 0.86 | 5710 | 12.8 | 3 | 81.2 | 10.2 |
| HONEST GUM | 2.2 | 162 | 12.8 | 3 | 68.7 | 39.8 |
| CMC 1380 | 1.36 | 1640 | 12.8 | 3 | 79.9 | 10.5 |

|  |  | EXAMPLE | | | | | | | COMPARATIVE EXAMPLE | |
|---|---|---|---|---|---|---|---|---|---|---|
|  |  | 1 | 2 | 3 | 4 | 5 | 6 | 7 | 1 | 2 |
| COMPONENTS (%) | CARBOXYMELTHYLCELLULOSE | 20 | 20 | 20 | 20 | 20 | 20 | 20 | 20 | 20 |
|  | HYDROCHLORIC ACID (1 mol/L) | 75 |  | 75 | 75 | 75 | 75 | 75 | 80 |  |
|  | HYDROCHLORIC ACID (0.75 mol/L) |  | 70 |  |  |  |  |  |  | 60 |
|  | MICROCRYSTALLINE CELLULOSE | 5 |  |  |  |  |  |  |  |  |
|  | PECTIN |  | 10 |  |  |  |  |  |  |  |
|  | SODIUM ALGINATE |  |  | 5 |  |  |  |  |  |  |
|  | GELLAN GUM |  |  |  | 5 |  |  |  |  |  |
|  | CARBOXYMETHYLCHITOSAN |  |  |  |  | 5 |  |  |  |  |
|  | POLYETHYLENE |  |  |  |  |  | 5 |  |  |  |
|  | POLY(L-LACTIC ACID) |  |  |  |  |  |  | 5 |  |  |
| MECHANICAL PROPERTY | BREAKING STRENGTH (N/mm$^2$) | 1.39 | 1.59 | 1.05 | 1.05 | 2.58 | 1.06 | 2.12 | 1.01 | 1.22 |
|  | EVALUATION | ○ | ○ | △ | △ | ○ | △ | ○ | × | △ |
|  | COMPRESSIVE MODULUS (N/mm$^2$) | 0.136 | 0.169 | 0.177 | 0.160 | 0.150 | 0.154 | 0.139 | 0.105 | 0.116 |
|  | EVALUATION | ○ | ○ | ○ | ○ | ○ | ○ | ○ | × | △ |
|  | MAXIMUM STRESS AT 50% COMPRESSION (N/mm$^2$) | 0.26 | 0.24 | 0.28 | 0.23 | 0.10 | 0.23 | 0.17 | 0.14 | 0.13 |
|  | EVALUATION | ○ | ○ | ○ | ○ | × | ○ | △ | × | × |
| SCORE |  | 9 | 9 | 8 | 8 | 7 | 8 | 8 | 3 | 5 |
| COMPREHENSIVE EVALUATION |  | ○ | ○ | ○ | ○ | ○ | ○ | ○ | × | × |

PREPARATION OF GELS DERIVED FROM CARBOXYMETHYL CELLULOSE ALKALI METAL SALT

BACKGROUND OF THE INVENTION

The present invention relates to a method of preparing a gel from carboxymethyl cellulose alkali metal salt (hereinafter referred as CMC) causing molecular bond (crosslinking) in CMC by using acid or acid solution.

CMC is one of the most commonly used water-soluble polymers at present. CMC is white or whity powder, and becomes transparent and odorless viscous solution by dissolving in water. As carboxymethyl cellulose is derived from a natural pulp, CMC has high safety. The CMC molecules form a three-dimensional network structure by crosslinking the molecules of CMC mutually. As a result, the CMC gel which firmly holds water in the network structure is obtained. The gel obtained thus has been widely used for foods, medicines, daily necessaries, coolants, or building materials, etc.

Some methods to prepare gels from anionic water soluble polymers are known; crosslinking polymers with polyvalent metal ions (see JP 0790121 A, JP 11106561 A, JP 2000191802 A and JP 2005263858 A) and crosslinking agents (see JP 2003190991 A, JP 09277421 A, and JP 10251447 A). Crosslinking is also introduced into polymers by irradiation of polymers' pastes, which are prepared by mixing polymers with water (see JP 200582800 A, JP 20012703 A , Bin Fei, Radoslaw A. Wach, Hiroshi Mitomo, Fumio Yoshii, and Tamikazu Kume, Journal of Applied Polymer Science, 78, 278-283(2000); Fumio Yoshii, Long Zhao, Radoslaw A. Wach, Naotsugu Nagasawa, Hiroshi Mitomo, and Tamikazu Kume, Nuclear Instruments and Methods in Physics Research B, 208(2003)320-324; Radoslaw A. Wach, Hiroshi Mitomo, Naotsugu Nagasawa and Fumio Yoshii, Radiation Physics and Chemistry, 68(2003)771-779.

BRIEF SUMMARY OF THE INVENTION

However, there is a possibility that polyvalent metal ions remain in a gel when polyvalent metal ions are used to prepare gel. In the method of forming the gel in which crosslinking agents are used, the usage of the formed gel is limited because the majority of the crosslinking agents have toxicity. In radiation induced gellation, large equipment must be required An object of the present invention is to provide a method of preparing a gel derived from CMC without using polyvalent metal ions or crosslinking agents. The gel is environmentally friendly and safe to human, and the gel can be used for foods and medicines.

Another object of the present invention is to provide a method of preparing a gel, by which an environmentally friendly type gel with high elasticity and high strength can be obtained easily, and the gel formed thereby.

The principle of the present invention is based on the inventors' new finding to prepare a gel from CMC causing molecular bond in CMC by using acid or acid solution.

In a preparation of a gel according to the first embodiment of the present invention, CMC, which is an anionic water-soluble polymer with high safety, is used as starting material. The gel is formed by mixing CMC and acid or acid solution.

Moreover, in a preparation of a gel according to the second embodiment of the present invention, the gel is formed by mixing CMC and water to form a paste, followed by immersing the CMC paste in acid or acid solution.

The mechanism of gel formation by the mixing of CMC and acid is considered as follows. The infrared absorption (IR) spectra of the gels formed by mixing CMC and acid were measured. The IR spectra were almost the same regardless of the kinds of acids, indicating that the gels have almost the same structure regardless of the kinds of acids. It is presumed from the measurement results of thermogravimetric analysis and differential thermal analysis of the gel that the gel is a gel formed by not the covalent bond newly introduced but the aggregation of CMC molecular chains. As CMC used is sodium salt, sodium in carboxyl group of CMC is replaced by hydrogen to be the form of —COOH. Therefore, the extension of CMC molecular chain is suppressed, and aggregation of CMC molecules occurs to form the hydrogen bond. As a result, the gel is formed. It is thought that softer gels are formed in which hydrogen bonds are few when a part of carboxyl groups remains in the form of —COONa.

In order to increase crosslinks of CMC, after mixing CMC with acid or acid solution the ionizing radiation can be performed to the mixed one. The ionizing radiation can be also performed to CMC gel, which was made by mixing CMC and water and then immersing the mixture in acid or acid solution, to introduce crosslinking in the gel. A CMC paste made by mixing CMC and water can be irradiated also and then is immersed in acid or acid solution to form a stiff gel. Crosslinkings can be introduced into CMC by irradiating CMC paste and thus the gel fraction can be increased.

Because the gel can be formed just by mixing CMC with acid or acid solution, reagents with toxicity such as the aforementioned polyvalent metal ions and crosslinking agents need not be used according to the above-mentioned embodiment. Moreover, because the ionizing radiation is not required, a special device such as the irradiation devices need not be used in the preparation of gels according to the invention. Especially, because the gels formed by the above mentioned methods have excellent compression modulus, which cannot be obtained in the conventional gel, and also high heat resistance and acid resistance, application to wider usage can be expected.

In a method of forming gel according to a third embodiment of the present invention, a gel can be formed just by mixing CMC which is the principal ingredient, acid or acid solution, and water-insoluble metal compound. The order of mixing of CMC, the acid or acid solution and the water-insoluble metal compound is not limited to the order described above, and thus this method is extremely simple.

Preferably, the weight of CMC is less than 65% by weight of the total weight of the initial materials in the third embodiment. When the weight of CMC exceeds 65%, it is difficult to mix them, and thus it is undesirable to exceed 65%.

As for an amount of use of acid or acid solution, 35% to 95% by weight of the total weight of the initial materials is desirable in the third embodiment. The gel is not formed uniformly when acid or acid solution is less than 35% by weight, and the gel preparation becomes difficult when it exceeds 95% by weight. Moreover, as for an amount of use of the water-insoluble metal compound, 1% to 30% by weight of the total weight of the initial materials is desirable. Strength is hardly improved when metal compounds is less than 1% by weight, and the gel is not formed uniformly when it exceeds 30% by weight. Preferably, hydrochloric acid or hydrochloric acid solution is used as acid or acid solution, and aluminum oxide is used as the water-insoluble metal compound in the forming method according to the third embodiment. By mixing three components of CMC, hydrochloric acid or hydrochloric acid solution and aluminum oxide as described above, the gel of high strength and high elasticity is obtained easily.

In a method of forming a CMC gel according to the fourth embodiment of the present invention, acid or acid solution and organic reinforcement are added to CMC, and then these components are mixed to obtain CMC gel.

In the fourth embodiment, the content of CMC is in the range of 3% to 64% by weight of the total weight of the mixture made by adding acid or acid solution and organic reinforcement to CMC.

In the fourth embodiment, it is desirable to use hydrochloric acid or hydrochloric acid solution as the acid or acid solution.

In the fourth embodiment, it is desirable to use one or more organic compounds selected from the group consisting of microcrystalline cellulose, pectin, alginic acid, gellan gum, carboxymethyl chitosan, polyethylene, and polyacrylic acid as organic reinforcement.

Although the water-insoluble metal compound is added to improve the elasticity and strength of gel in the third embodiment described above, the gel formed according to this method might cause the decrease in value as an environmentally friendly type gel when it is disposed of. However, as organic reinforcement is used in the fourth embodiment, the value as the environmentally friendly type gel might not be decreased when the waste is disposed of.

DETAILED DESCRIPTION OF THE PREFERRED EMBODIMENTS

Hereafter, a method of forming a CMC gel of the present invention is explained in detail based on the embodiments with reference to the drawings.

First Embodiment

TEST EXAMPLE 1

Gel A

Figure 1A:
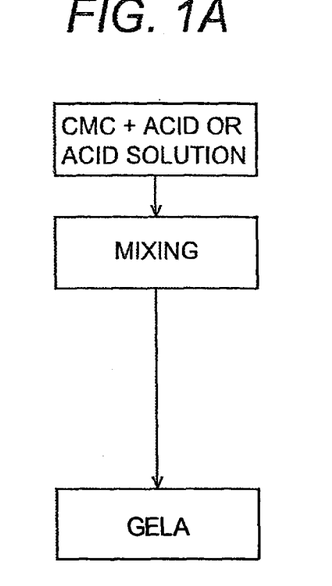
FIG. 1A is a flow chart of a gel preparation method according to the first embodiment of the present invention, in which the gel is formed by mixing CMC and acid or acid solution.

FIG. 1A shows a brief flow chart of gel preparation. When various CMCs (made by Daicel Chemical Industries Ltd., see FIG. 2) with different degree of substitution (degree of etherification) and viscosity (viscosity of 1% solution measured at 25° C. If the viscosity is high, molecular weight is also high) are mixed with 3 mol/l phosphoric acid solution, gelling occurred in all CMCs. The gel (hereinafter referred to as gel A) made thus has comparatively high compression modulus. Uncrosslinked CMC and phosphoric acid were removed by washing gel A with water, and the ratio of water insoluble components was determined as gel fraction. This result is shown in FIG. 2 and FIG. 3A.

Figure 2:
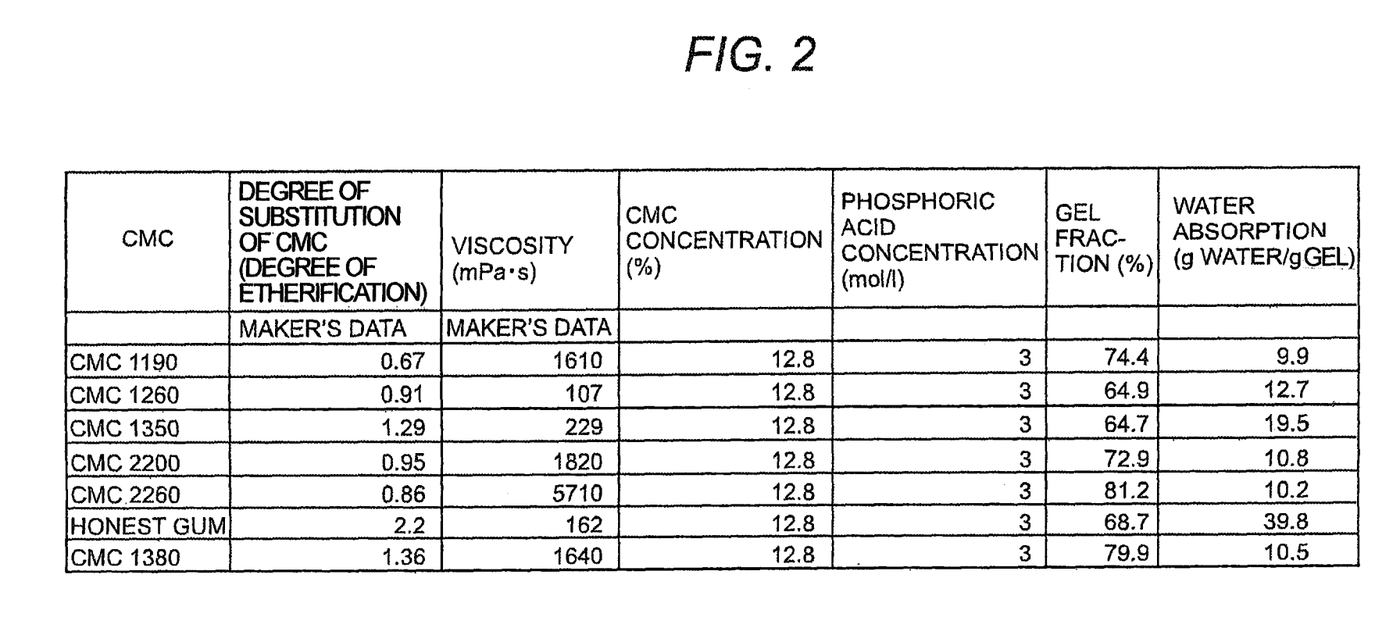
FIG. 2 is a view showing characteristics of the gel obtained by mixing various CMCs and phosphoric acid.
Figure 3A:
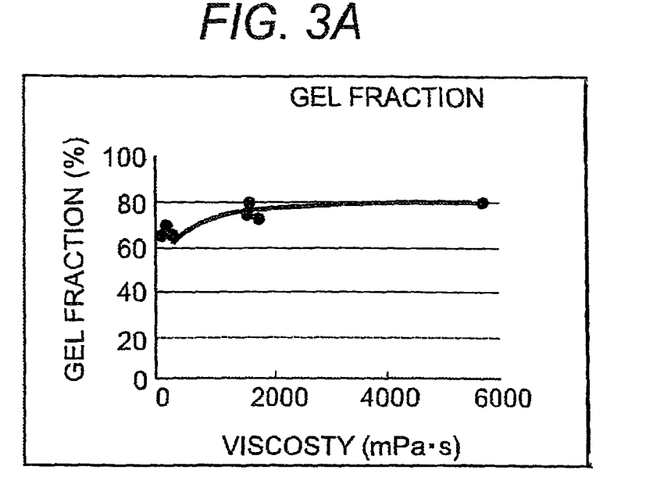
FIG. 3A is a graph illustrating the relationship between viscosity of CMC and gel fraction shown in FIG. 2.
Figure 3B:
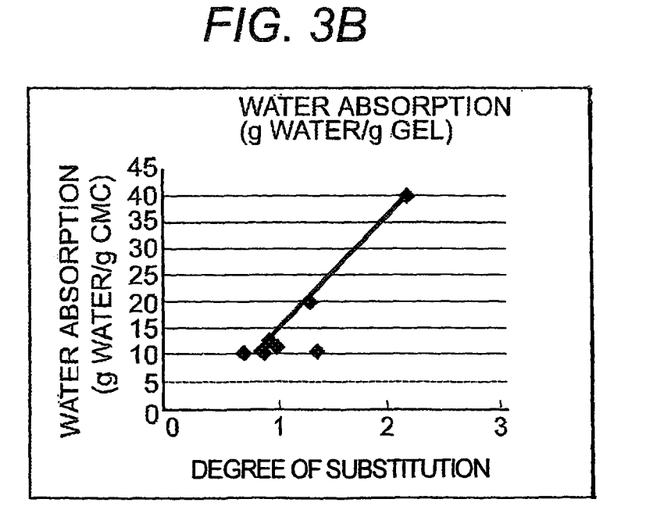
FIG. 3B is a graph illustrating the relationship between degree of substitution (degree of etherification) and water absorption of the gel shown in FIG. 2

FIG. 3A illustrates the relationship between viscosity of CMC and gel fraction shown in FIG. 2, and FIG. 3B illustrates the relationship between degree of substitution of CMC (degree of etherification) and water absorption of the gel shown in FIG. 2. It is understood from FIG. 3A that the gel fraction increases with increase of viscosity of CMC. Similarly, the tendency that water absorption increases with increase of degree of substitution of CMC (degree of etherification) is understood from FIG. 3B. It was confirmed that phosphoric acid did not remain in the gel by the measurement of phosphorus in the gel by EDX (Energy Dispersion X-ray fluorescence spectrometer) and ICP (Inductive Coupling Plasma mass spectrometer).

Figure 4:
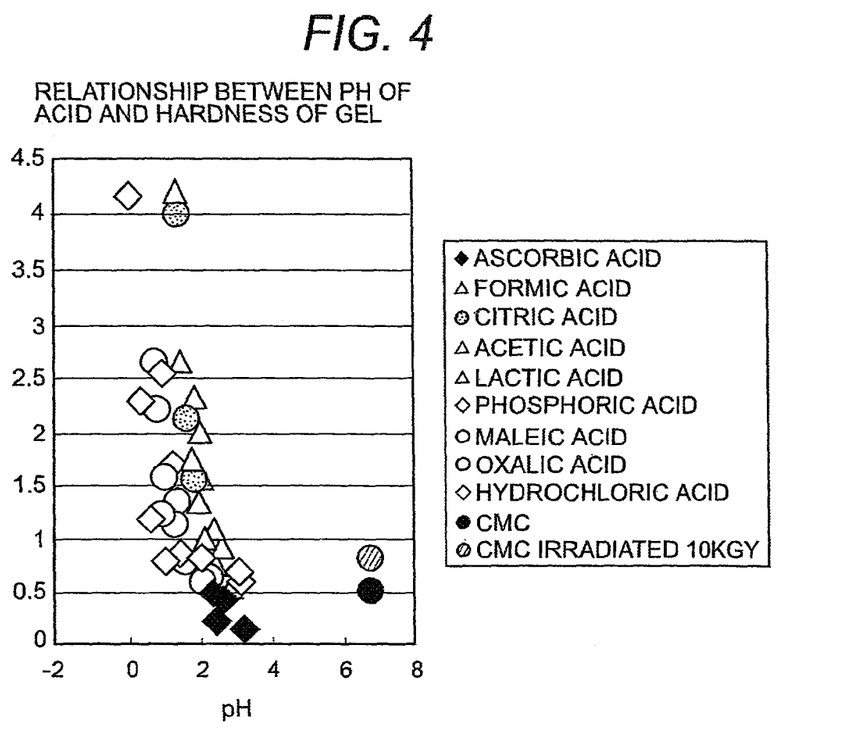
FIG. 4 is a view showing the hardness of each CMC gel obtained by mixing CMC1380 and various acid solutions.

Although the above-mentioned test example relates to the preparation of gel A by the mixing of CMC and phosphoric acid, similar experiments were carried out on other acids. Their results are shown in FIG. 4. It has been understood from FIG. 4 that CMC gel A with steady hardness (N) is formed even if normal CMC1380 and either of formic acid, citric acid, acetic acid, lactic acid, phosphoric acid, maleic acid, oxalic acid and hydrochloric acid solutions are mixed. Further, it has been understood that a soft gel had been formed with regard to ascorbic acid. The lower the pH of acid is, the higher the gel fraction becomes and the hardness of gel increases. It is, therefore, understood that it need not specify the kind of acid here, and the hardness of gel can be adjusted by changing the kind and the concentration of acid.

It can be understood from the test results shown in FIG. 2 that all CMCs on the market can be used. That is, it can be understood that all CMCs will gel by incorporating with acid or acid solution. Although the degree of substitution (degree of etherification) and the viscosity are arbitrary, gel A with different characteristics can be prepared by using CMC with different degree of substitution (degree of etherification) and molecular weight. In case that the concentration of CMC is high, the speed of gelling is fast, but it is slow in a low concentration. It is preferable that the concentration of CMC is within a range of 2.5 to 40 weight %, in which CMC can be mixed with acid or acid solution homogeneously.

Figure 5:
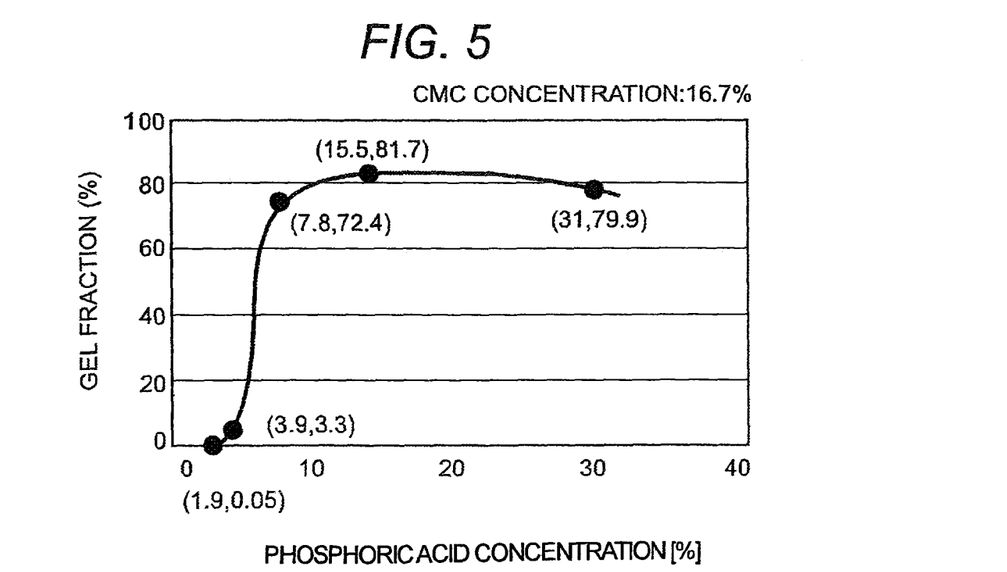
FIG. 5 is a graph showing the relationship between the concentration of phosphoric acid mixed with CMC and the gel fraction.

The gel with different characteristics can be formed according to the combination of CMC and acid. Although the concentration of acid is different depending on the kind of acid, 0.1 mol/l or more concentration of acid is roughly preferable. When high concentration of acid is used, the gelling rate is fast, the gel fraction is high, and a hard gel is formed. The relationship between the concentration (%) of phosphoric acid and gel fraction (%) is shown in FIG. 5 as one example to explain this fact. Up to about 7.8% phosphoric acid, the gel fraction increases rapidly to about 72.4%. After that, the gel fraction increases gradually even if its concentration increases. Further, the gel fraction increases according to the increase of the concentration of CMC. According to the experiment by the inventors, when the concentrations of CMC were 5, 10 and 20% in the mixing with 3 mol/l phosphoric acid, the gel fractions were 21.5, 85.8, and 86.1, respectively.

The temperature when CMC is mixed with acid or acid solution is arbitrary. In general, the gelling progresses more promptly when the temperature at mixing is higher. However, it is required to avoid mixing at temperature such that CMC undergoes hydrolysis, for instance, at 70° C. Moreover, the time left after CMC is mixed with acid or acid solution is arbitrary. The gelling progresses instantaneously when the concentrations of CMC and acid are high, that is, it happens at the same time as the mixing. On the other hand, the gelling progresses comparatively slowly when their concentrations are low. The reaction is concluded within roughly 24 hours though the gel fraction generally increases according to the leaving time after mixing

TEST EXAMPLE 2

Gel C

Figure 6A:
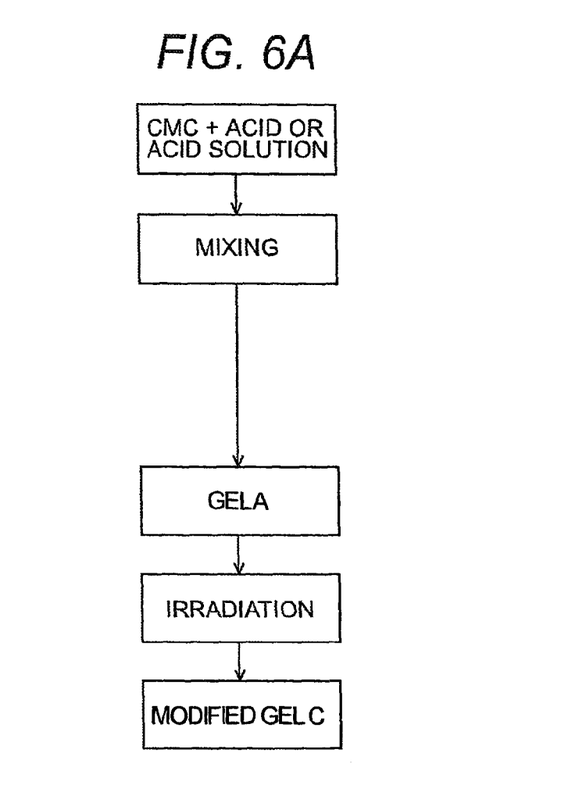
FIG. 6A is a flow chart showing a method of preparing a modified gel C, in which the radiation is performed to the gel obtained by mixing CMC and acid or acid solution.
Figure 6B:
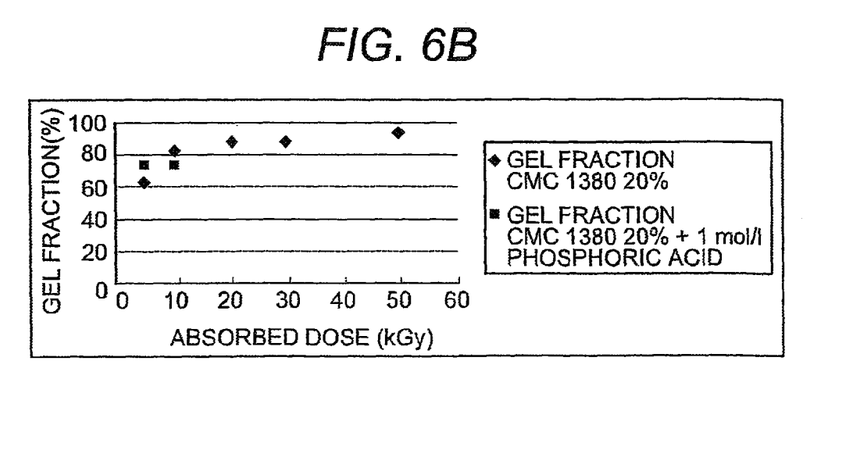
FIG. 6B and FIG. 6C each is a view showing the relationship between gel fraction and absorbed dose to prepare gel by irradiating the gamma ray to a gel obtained by mixing CMC and acid or acid solution in comparison to the radiation crosslinked gel.
Figure 6C:
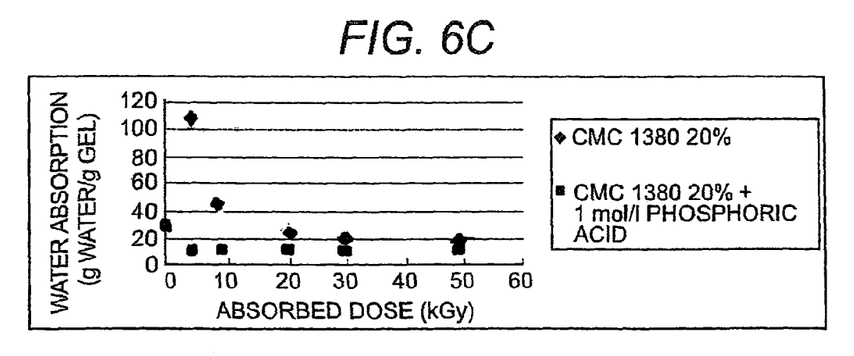

The preparation procedure of modified gel C is briefly shown in FIG. 6A. CMC paste prepared by mixing 20 weight % of CMC and water, and CMC gel A formed by mixing 20 weight % of CMC and 1 mol/l phosphoric acid are prepared. The latter is formed according to the flow chart shown in FIG. 1A. The gamma ray was irradiated to these CMC paste and CMC gel A respectively. As a result, a new modified gel (hereafter, referred to as modified gel C) was obtained. Gel fraction (%) and water absorption (g water/g gel) were measured for each of CMC paste and CMC gel C. Absorbed doses for CMC paste are 5 kGy, 10 kGy, 20 kGy, 30 kGy, 40 kGy and 50 kGy. Absorbed doses for CMC gel A are 5 kGy and 10 kGy. The measured values are shown in FIG. 6B and FIG. 6C.

It is easily understood that some % of CMC, which are not gelled by acid, turns into gel by irradiation. The gel fraction increases and the water absorption decreases according to the irradiation at 5 kGy. Namely, a stronger gel can be obtained by irradiating CMC gel A. Moreover, in the gel obtained by mixing CMC and acid or acid solution, the gelling progresses in low dose compared with the case where the radiation is performed to CMC paste obtained by mixing CMC with water as described above. In addition, in the gel formed by using high concentration of acid, an amount of water absorption is a little, and the influence by the irradiation is hardly received.

Second Embodiment

TEST EXAMPLE 3

Gel B

Figure 1B:
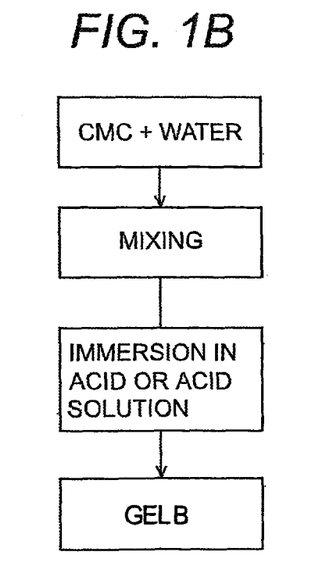
FIG. 1B is a flow chart of a gel preparation method according to the second embodiment, in which the gel is formed by immersing the paste obtained by adding water to CMC in acid or acid solution.

The preparation steps of gel B are briefly shown in FIG. 1B. When CMC paste produced by mixing 20 weight % of CMC and 80 weight % of water is immersed in 0.1 mol/l hydrochloric acid, a gel (hereafter, referred to as gel B) was formed. The gel fraction of the production was 35%, and an amount of water absorption per 1 g of a dried gel was 340 g. When CMC paste is immersed in acid or acid solution, the gelling happened in acid solution whose concentration is lower than the concentration of acid when CMC is mixed with acid or acid solution.

TEST EXAMPLE 4

Gel D

Figure 7:
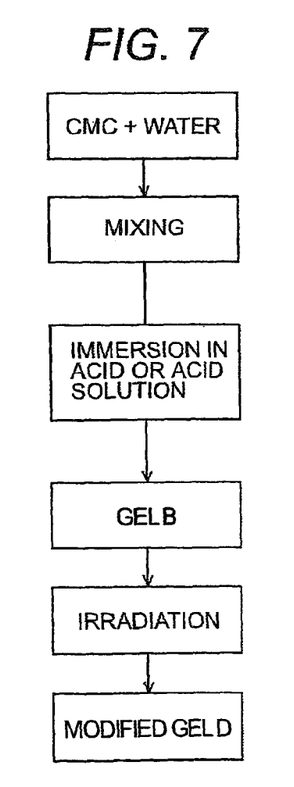
FIG. 7 is a flow chart showing a method of preparing a modified gel D, in which the paste obtained by adding water to CMC is immersed in acid or acid solution, and then gamma ray is irradiated to the obtained gel to form the modified gel D.
Figure 8:
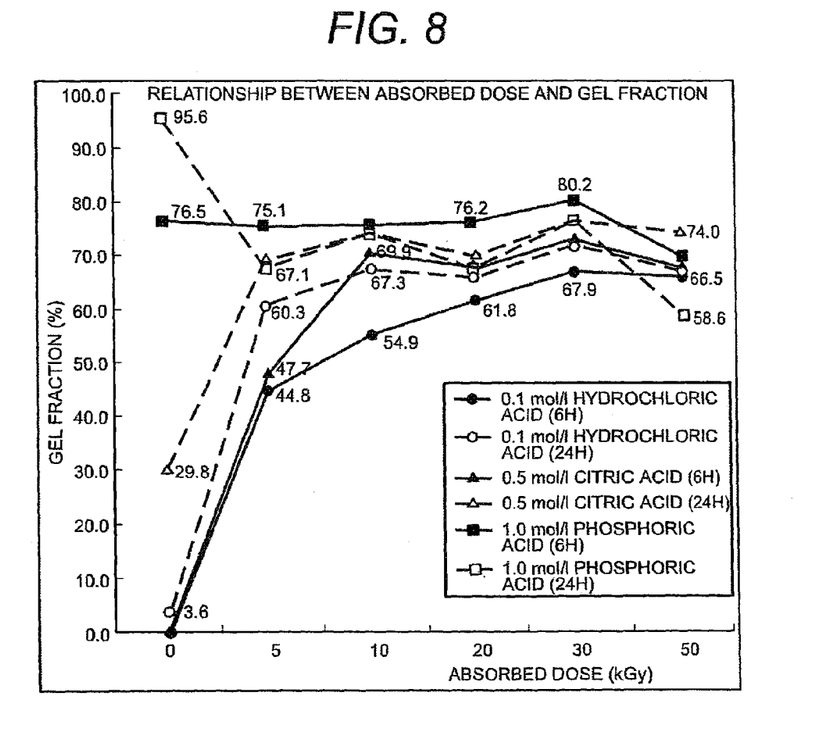
FIG. 8 is a graph illustrating the relationship between absorbed dose and the gel fraction of the modified gel formed according to the flow chart shown in FIG. 7.

The preparation flow of modified gel D is briefly shown in FIG. 7. The gamma ray was irradiated to the CMC gel (gel B) obtained by immersing the CMC paste in acid or acid solution. As a result, a modified gel (hereafter, referred to as gel D) was formed. Numeric data of modified gel D after the gamma ray is irradiated are shown in FIG. 8. In FIG. 8, solid lines and broken lines indicate a characteristic of modified gel D prepared by immersing CMC paste in acid solution for 6 h and 24 h, respectively. According to the graphs in FIG. 8, the gel fraction increases remarkably by irradiating the gamma ray when the concentration of acid is low enough. However, it shows generally the characteristic of leveling off after the absorbed dose of the gamma ray exceeds 10 kGy. On the other hand, high gel fraction is obtained by immersion for 6 h when the concentration of acid is high enough, and the gel fraction does not improve even if the gamma ray is irradiated.

TEST EXAMPLE 5

Gel E

Radiation-crosslinked CMC gel produced by irradiating gamma ray at 5 kGy to the CMC paste formed by mixing 20 weight % of CMC and 80 weight % of water was immersed in 0.1 mol/l hydrochloric acid solution whose weight is 10 times of radiation-crosslinked CMC gel, and the paste was left for 16 hours at room temperature. As a result, the gel fraction increased from 33% to 73%, but an amount of water absorption per 1 g of the dried gel decreased from 887 g to 90 g. This demonstrates that the physical-crosslinking proceeds by immersing the gel in hydrochloric acid solution and a new modified gel (hereafter, referred to as gel E) is formed. The gel formed thus shows the gel fraction and the water absorption corresponding to those of the radiation-crosslinked gel at 20 kGy. It is, therefore, understood that the processing in acid contributes the decrease of absorbed dose. In addition, a gel with higher strength can be obtained by immersing the radiation-crosslinked gel in acid or acid solution.

Figure 9:
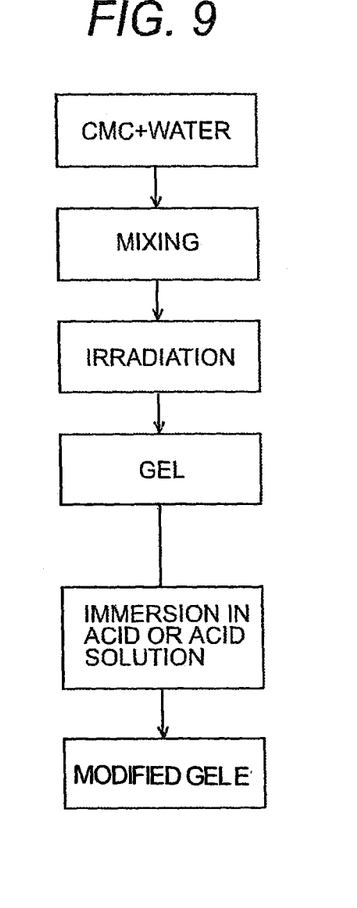
FIG. 9 is a flow chart showing a method of preparing an modified gel, in which gamma ray is irradiated to the paste obtained by adding water to CMC, and then the obtained gel is immersed in acid or acid solution to form the modified gel E.
Figure 10:
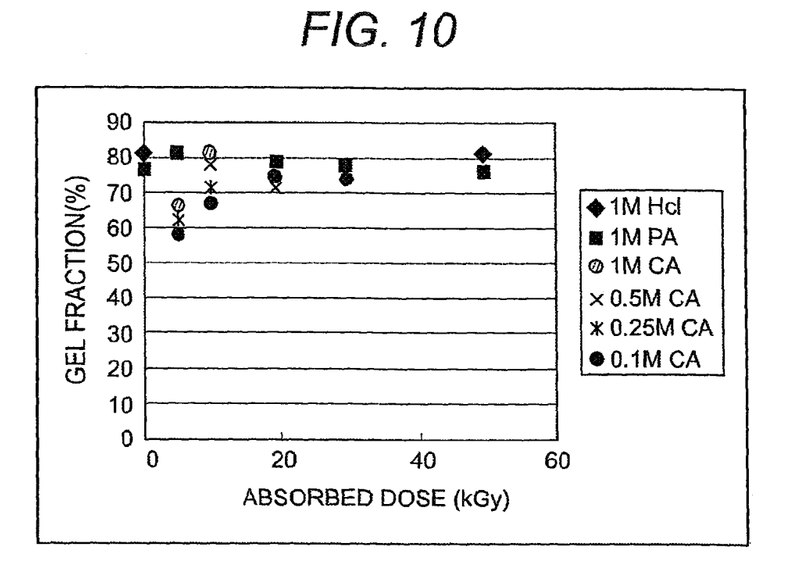
FIG. 10 is a graph illustrating the relationship between the absorbed dose and the gel fraction of the modified gel prepared according to the flow chart shown in FIG. 9.

The process to prepare the above-mentioned gel E is shown in FIG. 9. Moreover, the gel fraction of gel E prepared according to the flow chart of FIG. 9 is shown in FIG. 10. In FIG. 10, HCl designates hydrochloric acid, PA phosphoric acid, CA citric acid and M mol/l. As understood easily from the graph of FIG. 10, the gel fraction of gel E is hardly changed regardless of the absorbed dose.

Although the gamma ray is irradiated to the gel obtained by mixing CMC and acid or acid solution in one example of the modified gel preparation methods described above, the radiation is not limited to the gamma ray, but includes an electron beam used in the technical field of irradiation-crosslinking. In addition, although only one kind of acid is used in the above-mentioned examples, it may be possible to form a similar gel even if two or more kinds of acids are combined and used as clearly seen from the principle of the present embodiment. Further, although the terms called gel A, gel B, gel C, gel D and gel E are used in the above-mentioned explanation; these terms are used not for the explanation of the molecular bond structure of the gel formed, but to facilitate the understanding of the gel preparation method.

Third Embodiment

Figure 11:
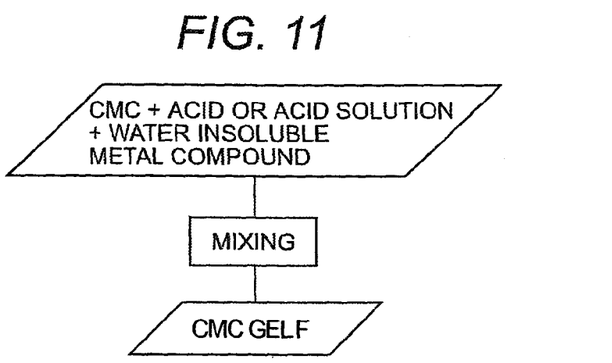
FIG. 11 is a flow chart of a gel preparation method according to the third embodiment of the present invention, by which the highly elastic and strong gel F is formed.

Next, a method of preparing a gel according to the third embodiment of the present invention is explained with reference to FIG. 11. FIG. 11 is a flow chart of a gel preparation method according to the third embodiment of the present invention, by which the highly elastic and strong gel is formed.

In FIG. 11, CMC, acid or acid solution and water-insoluble metal compound are mixed with a kneading machine. As a result, a CMC gel is formed.

The degree of etherification and the viscosity of CMC used are arbitrary. The viscosity here indicates the viscosity of 1 weight % CMC aqueous solution measured at 25° C. The higher viscosity indirectly means the higher molecular weight. CMC in the form of powder or aqueous solution can be mixed well with acid or acid solution. The solution of the concentration of 5% by weight or more is preferable to mix more easily. Either of the organic acid or inorganic acid is acceptable for acid. Further, the kind of acid is arbitrary. For instance, hydrochloric acid, sulfuric acid, phosphoric acid, poly phosphoric acid, nitric acid, formic acid, acetic acid, lactic acid, succinic acid, itaconic acid, maleic acid, oxalic acid, and citric acid, etc. can be used. Although the concentration of these acid solution is arbitrary, it is preferable to be 0.1 mol/l or more to mix easily.

The water-insoluble metal compound used by the third embodiment of the present invention includes, but is not limited to, a water-insoluble metal compound. Metal compounds which can be used include metallic oxides such as titanium oxide, iron oxide, aluminum oxide, manganese oxides and manganese dioxide, and metal salts such as barium sulfate, barium carbonate, barium phosphate, calcium carbonate, and calcium phosphate. Especially, aluminum oxide is preferable.

The temperature when CMC is mixed with acid or acid solution is arbitrary. In general, the gelling progresses promptly according to the increase of the temperature at mixing. However, it is required to avoid mixing at temperature such that CMC undergoes hydrolysis, for instance, at 70° C. Moreover, the time left after CMC is mixed with water-insoluble metal compound and acid or acid solution can be set arbitrarily. The gelling progresses instantaneously when the concentrations of CMC aqueous solution and acid solution are high. The gel fraction, rate of the gel which is water-insoluble, generally increases according to the leaving time after mixing

TEST EXAMPLE 1 OF THE THIRD EMBODIMENT 20 g of commercial CMC (the degree of etherification is 1.36 and the viscosity of 1 weight % aqueous solution is 1640 mPa·s at 25° C, made by Daicel Chemical Industries Ltd.) and 5 g of commercial anatase-type titanium oxide (202-01725 made by Wako Pure Chemical Industries, Ltd.) were added to 75 g of 1 mol/l hydrochloric acid, mixed at 2000 rpm for 20 minutes by using super mixer "Awatori Rentaro" produced by THINKY Corporation, and then defoamed for 10 minutes. The mixed sample paste was put in a frame made of Teflon (registered trademark) of 20 mm in diameter and 10 mm in thickness, and molded. After the molded sample had been preserved for seven days at 30° C., the physical properties were measured with small type desk-top tester EZTest made by Shimadzu Corporation. The breaking strength of the gel was measured by compressing the gel with the compression jig made of Teflon (registered trademark) of 50 mm in diameter. The breaking strength was 0.88 N/mm$^2$. Moreover, compression modulus when the gel was compressed to 50% of its original thickness was measured with this tester. The compression modulus was 1.12 N/mm$^2$. The gel maintained the former shape even after the 50% compression twice, and the gel showed high restoring force and high elasticity.

TEST EXAMPLE 2 OF THE THIRD EMBODIMENT 40 g of commercial CMC (the degree of etherification is 1.36 and the viscosity of 1 weight % aqueous solution is 1640 mPa·s at 25° C., made by Daicel Chemical Industries Ltd.) and 13.6 g of commercial aluminum oxide (01201965 made by Wako Pure Chemical Industries, Ltd.) were added to 46.4 g of 1 mol/l hydrochloric acid, mixed at 2000 rpm for 20 minutes by using super mixer "Awatori Rentaro" made by THINKY Corporation, and then defoamed for 10 minutes. The mixed CMC paste was expanded to 10 mm in thickness, and pierced with the cork borer. After the pierced sample had been preserved for seven days at 30° C., the breaking strength of the gel was measured by using Strograph VE5D made by Toyo Seiki. The breaking strength was 5.87 N/mm$^2$. Moreover, compression modulus when the gel was compressed to 50% of its original thickness was measured with small type desk-top tester EZTest made by Shimadzu Corporation. The compression modulus was 7.99 N/mm$^2$. The gel maintained the former shape even after the 50% compression twice, and the gel showed high restoring force and high elasticity.

COMPARATIVE EXAMPLE 1 OF THE THIRD EMBODIMENT 20 g of commercial CMC (the degree of etherification is 1.36 and the viscosity of 1 weight % aqueous solution is 1640 mPa·s at 25° C., made by Daicel Chemical Industries Ltd.) was added to 80 g of 1 mol/l hydrochloric acid and mixed at 2000 rpm for 20 minutes by using super mixer "Awatori Rentaro" made by THINKY Corporation, and then defoamed for 10 minutes. The mixed sample paste was put in a frame made of Teflon (registered trademark) of 20 mm in diameter and 10 mm in thickness, and molded. After the molded sample had been preserved for seven days at 30° C., the physical properties were measured with small type desk-top tester EZTest made by Shimadzu Corporation. The breaking strength of the gel was measured by compressing the gel with the compression jig made of Teflon (registered trademark) of 50 mm in diameter. The breaking strength was 0.44 N/mm$^2$.

Moreover, the compression modulus when the gel was compressed to 50% of its original thickness was measured with this tester. The compression modulus was 0.16 N/mm². The gel did not maintain the former shape after the 50% compression once.

COMPARATIVE EXAMPLE 2 OF THE THIRD EMBODIMENT 40 g of commercial CMC (the degree of etherification is 1.36 and the viscosity of 1 weight % aqueous solution is 1640 mPa·s at 25° C., made by Daicel Chemical Industries Ltd.) was added to 60 g of 1 mol/l hydrochloric acid, mixed at 2000 rpm for 20 minutes by using super mixer "Awatori Rentaro" made by THINKY Corporation, and then defoamed for 10 minutes. The mixed sample paste was expanded to 10 mm in thickness, and pierced with the cork borer. After the pierced sample had been preserved for seven days at 30° C., the breaking strength of the gel was measured with small type desk-top tester EZTest made by Shimadzu Corporation. The breaking strength of the gel was measured by compressing the gel with the compression jig made of Teflon (registered trademark) of 50 mm in diameter. The breaking strength was 1.03 N/mm².

The gel formed according to the third embodiment of the present invention has high elasticity compared with that formed by using polyvalent metal ions or crosslinking agents. Moreover, it is possible to form a gel inexpensively and easily because expensive radiation equipment is not required. In addition, the gel of high strength can be formed differently from a gel forming method in which only acid is used. The obtained gel is one of environmentally friendly type gels, because the raw material is derived from plant.

Such a CMC gel can be used in wide-ranging fields such as agriculture, industry, and medical treatment, and preferably for domestic animal waste treatment agents, waste water treatment agents, deodorization materials, catalyst carriers, shock-absorption materials, medical applications for sticking materials and patty materials, etc.

Fourth Embodiment

Figure 12:
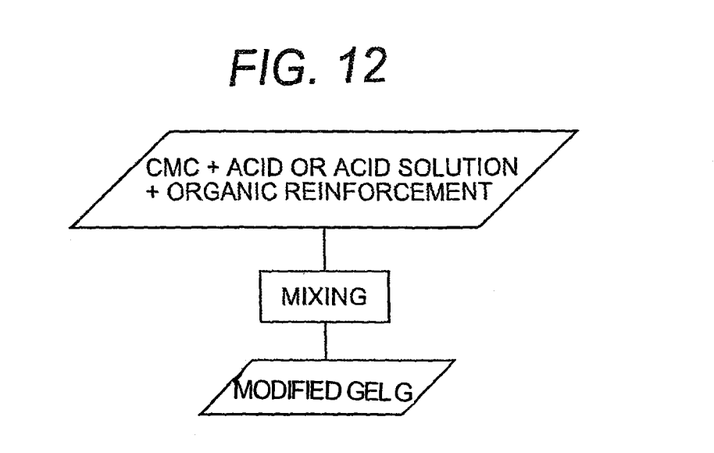
FIG. 12 is a flow chart of a gel preparation method according to the fourth embodiment of the present invention, by which the highly elastic and strong gel G is formed.

Finally, the fourth embodiment of the present invention is explained with reference to FIG. 12 and FIG. 13. FIG. 12 is a flow chart of a gel preparation method according to the fourth embodiment of the present invention, by which the gels with high elasticity and high strength are formed. In this method, acid or acid solution and organic reinforcements are added to CMC first. They are mixed with a kneading machine, etc. to form a gel. That is, the gel of the CMC (hereafter, also referred to as "CMC gel G") is formed.

CMC alkali salts used in the fourth embodiment include, for example, sodium, potassium salt, and ammonium salt. The degree of etherification and the viscosity of CMC used are arbitrary. The viscosity here indicates the viscosity of 1 weight % CMC aqueous solution measured at 25° C. The higher viscosity indirectly means higher molecular weight. CMC in the form of powder or aqueous solution can be mixed well with acid or acid solution. The solution of the concentration of 5% by weight or more is preferable to mix more easily.

As for concentrations of CMC, 3 to 64% CMC by weight is used, preferably 10 to 34% by weight of the total amount of the mixture which includes CMC, acid or acid solution, and organic reinforcement. When the weight of CMC is less than 3% by weight, CMC gel with enough strength might not be obtained. Moreover, when the weight of CMC exceeds 64% by weight, it might be difficult to mix uniformly.

Either of the organic acid or inorganic acid is acceptable for acid used in the fourth embodiment. Further, the kind of acid is arbitrary. For instance, hydrochloric acid, sulfuric acid, phosphoric acid, poly phosphoric acid, nitric acid, formic acid, acetic acid, lactic acid, succinic acid, itaconic acid, maleic acid, oxalic acid, and citric acid, etc. or their acid solution can be used. These acid or acid solutions can be used alone or in combination. It is preferable to use hydrochloric acid or hydrochloric acid solution to obtain CMC gel of high strength and high elasticity.

Although the concentration of acid solution is arbitrary, it is preferable to be in the range of 0.1 mol/l and 3 mol/l to mix easily. Generally, the gelling rate increases when the concentrations of CMC and acid are high. Therefore, the gelling progresses instantaneously when the concentration of acid solution is too high, and it might be difficult to make organic reinforcement mixed with CMC.

As for an amount of acid or acid solution, 35 to 95% by weight is used, preferably 60% to 90% by weight of the total amount of the mixture which includes CMC, acid or acid solution, and organic reinforcement. When the weight of acid or acid solution is less than 35% by weight, CMC gel becomes heterogeneous and CMC gel of enough strength might not be obtained. Moreover, when the weight of acid or acid solution exceeds 95% by weight, it might be difficult to form a gel.

The organic reinforcement used in the fourth embodiment is especially important to improve the elasticity and strength of the CMC gel obtained. CMC gel of high strength and high elasticity can be obtained by adding the organic reinforcement to CMC with acid or acid solution. Such an organic reinforcement includes, for instance, cellulose derivatives, polysaccharides, amino acids, polymers, and saccharides, etc. Concretely, it includes: cellulose derivatives such as microcrystalline cellulose, cellulose triacetate, hydroxypropyl methyl cellulose, ethyl cellulose, and methyl cellulose; polysaccharides such as agar-agar, alginic acid, gellan gum, pectin, Psylium seed gum, guar gum, Arabian gum, carboxymethyl chitosan, Arabinogalactan, carrageenan, tamarind seed gum, mannan, chitin, and chitosan; polymers such as gelatin, polyvinyl alcohol, polyacrylic acid, polyvinyl pyrrolidone, polyethylene, and polylactic acid, etc.; amino acids such as glycine, alanine, and glutamic acid; and saccharides such as sucrose, glucose, and fructose. These substances can be used alone or in combination. It is preferable to use one or more organic compounds selected from the group consisting of microcrystalline cellulose, pectin, alginic acid, gellan gum, carboxymethyl chitosan, polyethylene, and polylactic acid to obtain CMC gel of high strength and high elasticity.

As for an amount of use of organic reinforcement, 1 to 30% by weight is used, preferably 2% to 10% by weight of the total amount of the mixture which includes CMC, acid or acid solution, and organic reinforcement. When the weight of organic reinforcement is less than 1% by weight, CMC gel of enough strength and elasticity might not be obtained. Moreover, when the weight of organic reinforcement exceeds 30% by weight, CMC gel might become un-uniform, and CMC gel of enough strength might not be obtained.

As described above, CMC gel is obtained by adding acid or acid solution and organic reinforcements to CMC first, and mixing them with a kneading machine, etc. to form a gel. The order of the mixing of CMC, an acid or acid solution and organic reinforcement is arbitrary. For instance, after organic reinforcement is added to CMC and mixed, acid or acid solution can be added to them and mixed. Moreover, it is possible to add organic reinforcement and acid or acid solution to CMC at the same time, and mix them. Any commercial kneading machines which can mix three components of CMC, acid or acid solution and organic reinforcement effectively may be used for the above-mentioned kneading machine. Further, it is possible to mix materials directly with a screw type stirrer. Moreover, it is also possible to use super mixer "Awatori Rentaro" made by THINKY Corporation. Because the container of this mixer where the raw materials are stored revolves while rotating, homogeneous stir can be achieved without leaving a large amount of bubble in the materials.

It is required to avoid mixing at temperature such that CMC undergoes hydrolysis, for instance, at 70° C. In general, the gelling progresses more promptly when the temperature at mixing is higher. Therefore, the gelling is made to be progressed by properly setting the mixing temperature in consideration of the progress of gelling and the degree of the mixing with CMC, which is determined according to the kind of the organic reinforcement used and the amount of use thereof. The aimed CMC gel can be obtained by leaving at a certain time after mixing. Although the time left after CMC is mixed with acid or acid solution is arbitrary, the gel fraction generally increases according to the leaving time after mixing

TEST EXAMPLE 1 OF THE FOURTH EMBODIMENT 20 g of commercial CMC (the degree of etherification is 1.36 and the viscosity of 1 weight % aqueous solution is 1640 mPa·s at 25° C., made by Daicel Chemical Industries Ltd.) and 5 g of commercial microcrystalline cellulose (for a column chromatography made by Funakoshi Corporation) were added to 75 g of 1 mol/l hydrochloric acid, mixed at 2000 rpm for 20 minutes by using super mixer "Awatori Rentaro" made of THINKY Corporation, and then defoamed for 10 minutes. The sample paste was put in a frame made of Teflon (registered trademark) of 20 mm in diameter and 10 mm in thickness, and shaped. After the shaped sample had been preserved for seven days at 30° C., the physical properties were measured with small type desk-top tester EZTest made by Shimadzu Corporation. The breaking strength and compression modulus of the gel were measured by compressing the gel with the compression jig made of Teflon (registered trademark) of 50 mm in diameter. The breaking strength was 1.39 N/mm$^2$ and the compression modulus was 0.136 N/mm$^2$. Moreover, the maximum stress when the gel was compressed to 50% of its original thickness was measured with this tester. The maximum stress was 0.26 N/mm$^2$. The gel maintained the former shape even after the 50% compression, twice, and the gel showed high restoring force and high elasticity.

TEST EXAMPLE 2 OF THE FOURTH EMBODIMENT 20 g of commercial CMC (the degree of etherification is 1.36 and the viscosity of 1 weight % aqueous solution is 1640 mPa·s at 25° C. made by Daicel Chemical Industries Ltd.) and 10 g of commercial pectin (INAGEL JP-20 made by Ina Food Industry Co., Ltd.) were added to 70 g of 0.75 mol/l hydrochloric acid, mixed at 2000 rpm for 20 minutes by using super mixer "Awatori Rentaro" made of THINKY Corporation, and then defoamed for 10 minutes. The sample paste was expanded to 10 mm in thickness, and pierced with the cork borer. After the pierced sample had been preserved for five days at 30° C., the breaking strength and compression modulus of the gel were measured with small type desk-top tester EZTest made by Shimadzu Corporation. The breaking strength was 1.59 N/mm$^2$ and the compression modulus was 0.169 N/mm$^2$. Moreover, the maximum stress when the gel was compressed to 50% of its original thickness was measured with this tester. The maximum stress was 0.24 N/mm$^2$. The gel maintained the former shape even after the 50% compression twice, and the gel showed high restoring force and high elasticity.

The tension test was carried out with small type desk-top tester EZTest made by Shimadzu Corporation by using a strip specimen of 0.5 mm in thickness and 8 mm in width. The breaking strength was 4.15N and the Young's modulus was 2.48N.

TEST EXAMPLE 3 OF THE FOURTH EMBODIMENT 20 g of commercial CMC (the degree of etherification is 1.36 and the viscosity of 1 weight % aqueous solution is 1640 mPa·s at 25° C., made by Daicel Chemical Industries Ltd.) and 5 g of commercial alginic acid (INAGEL GS-30 made by Ina Food Industry Co., Ltd.) were added to 75 g of 1 mol/l hydrochloric acid, mixed at 2000 rpm for 20 minutes by using super mixer Awatori Rentaro made by THINKY Corporation, and then defoamed for 10 minutes. The sample paste was put in a frame made of Teflon (registered trademark) of 20 mm in diameter and 10 mm in thickness, and shaped. After the shaped sample had been preserved for seven days at 30° C., the physical properties were measured with small type desk-top tester EZTest made by Shimadzu Corporation. The breaking strength and compression modulus of the gel were measured by compressing the gel with the compression jig made of Teflon (registered trademark) of 50 mm in diameter. The breaking strength was 1.05 N/mm$^2$ and the compression modulus was 0.177 N/mm$^2$. Moreover, the maximum stress when the gel was compressed to 50% of its original thickness was measured with this tester. The maximum stress was 0.28 N/mm$^2$. The gel maintained the former shape even after the 50% compression, the compression was carried out twice, and the gel showed high restoring force and high elasticity.

TEST EXAMPLE 4 OF THE FOURTH EMBODIMENT 20 g of commercial CMC (the degree of etherification is 1.36 and the viscosity of 1 weight % aqueous solution is 1640 mPa s at 25° C., made by Daicel Chemical Industries Ltd.) and 5 g of commercial gellan gum (INAGEL GS-15 made by Ina Food Industry Co., Ltd.) were added to 75 g of 1 mol/l of hydrochloric acid, mixed at 2000 rpm for 20 minutes by using super mixer "Awatori Rentaro" made by THINKY Corporation, and then defoamed for 10 minutes. The sample paste was put in a frame made of Teflon (registered trademark) of 20 mm in diameter and 10 mm in thickness, and shaped. After the shaped sample had been preserved for seven days at 30° C., the physical properties were measured with small type desk-top tester EZTest made by Shimadzu Corporation. The breaking strength and compression modulus of the gel were measured by compressing the gel with the compression jig made of Teflon (registered trademark) of 50 mm in diameter. The breaking strength was 1.05 N/mm$^2$ and the compression modulus was 0.160 N/mm$^2$. Moreover, the maximum stress when the gel was compressed to 50% of its original thickness was measured with this tester. The maximum stress was 0.23 N/mm$^2$. The gel maintained the former shape even after the 50% compression twice, and the gel showed high restoring force and high elasticity.

TEST EXAMPLE 5 OF THE FOURTH EMBODIMENT 20 g of commercial CMC (the degree of etherification is 1.36 and the viscosity of 1 weight % aqueous solution is 1640 mPa·s at 25° C., made by Daicel Chemical Industries Ltd.) and 5 g of commercial carboxymethyl chitosan were added to 75 g of 1 mol/l of hydrochloric acid, mixed at 2000 rpm for 20 minutes by using super-mixer Awatori-Rentaro made of THINKY Corporation, and then defoamed for 10 minutes. The sample paste was put in a frame made of Teflon (registered trademark) of 20 mm in diameter and 10 mm in thickness, and shaped. After the shaped sample had been preserved for seven days at 30° C., the physical properties were measured with small type desk-top tester EZTest made by Shimadzu Corporation. The breaking strength and compression modulus of the gel were measured by compressing the gel with the compression jig made of Teflon (registered trademark) of 50 mm in diameter. The breaking strength was 2.58 N/mm$^2$ and the compression modulus was 0.150 N/mm$^2$. Moreover, the maximum stress when the gel was compressed to 50% of its original thickness was measured with this tester. The maximum stress was 0.10 N/mm$^2$. The gel maintained the former shape even after the 50% compression, the compression was carried out twice, and the gel showed high restoring force and high elasticity.

TEST EXAMPLE 6 OF THE FOURTH EMBODIMENT 20 g of commercial CMC ( the degree of etherification is 1.36 and the viscosity of 1 weight % aqueous solution is 1640 mPa·s at 25° C., made by Daicel Chemical Industries Ltd.) and 5 g of commercial polyethylene were added to 75 g of 1 mol/l hydrochloric acid, mixed at 2000 rpm for 20 minutes by using super-mixer Awatori-Rentaro made of THINKY Corporation, and then defoamed for 10 minutes. The sample paste was put in a frame made of Teflon (registered trademark) of 20 mm in diameter and 10 mm in thickness, and shaped. After the shaped sample had been preserved for seven days at 30° C., the physical properties were measured with small type desk-top tester EZTest made by Shimadzu Corporation. The breaking strength and compression modulus of the gel were measured by compressing the gel with the compression jig made of Teflon (registered trademark) of 50 mm in diameter. The breaking strength was 1.06 N/mm$^2$ and the compression modulus was 0.154 N/mm$^2$. Moreover, the maximum stress when the gel was compressed to 50% of its original thickness was measured with this tester. The gel maintained the former shape even after the 50% compression twice and the gel showed high restoring force and high elasticity.

TEST EXAMPLE 7 OF THE FOURTH EMBODIMENT 20 g of commercial CMC (the degree of etherification is 1.36 and the viscosity of 1 weight % aqueous solution is 1640 mPa·s at 25° C. made by Daicel Chemical Industries Ltd.) and 5 g of commercial polylactic acid were added to 75 g of 1 mol/l of hydrochloric acid, mixed at 2000 rpm for 20 minutes by using super-mixer Awatori-Rentaro made of THINKY Corporation, and then defoamed for 10 minutes. The sample paste was put in a frame made of Teflon (registered trademark) of 20 mm in diameter and 10 mm in thickness, and shaped. After the shaped sample had been preserved for seven days at 30° C., the physical properties were measured with small type desk-top tester EZTest made by Shimadzu Corporation. The breaking strength and compression modulus of the gel were measured by compressing the gel with the compression jig made of Teflon (registered trademark) of 50 mm in diameter. The breaking strength was 2.12 N/mm$^2$ and the compression modulus was 0.139 N/mm$^2$. Moreover, the maximum stress when the gel was compressed to 50% of its original thickness was measured with this tester. The maximum stress was 0.17 N/mm$^2$. The gel maintained the former shape even after the 50% compression twice, and the gel showed high restoring force and high elasticity.

COMPARATIVE EXAMPLE 1 OF THE FOURTH EMBODIMENT 20 g of commercial CMC (the degree of etherification is 1.36 and the viscosity of 1 weight % aqueous solution is 1640 mPa·s at 25° C., made by Daicel Chemical Industries Ltd.) was added to 80 g of 1 mol/l of hydrochloric acid, mixed at 2000 rpm for 20 minutes by using super-mixer Awatori-Rentaro made of THINKY Corporation, and then defoamed for 10 min. The mixed sample paste was put in a frame made of Teflon (registered trademark) of 20 mm in diameter and 10 mm in thickness, and shaped. After the shaped sample had been preserved for seven days at 30° C., the physical properties were measured with small type desk-top tester EZTest made by Shimadzu Corporation. The breaking strength and compression modulus of the gel were measured by compressing the gel with the compression jig made of Teflon (registered trademark) of 50 mm in diameter. The breaking strength was 1.01 N/mm$^2$ and the compression modulus was 0.105 N/mm$^2$. Moreover, the maximum stress when the gel was compressed to 50% of its original thickness was measured with this tester. The maximum stress was 0.14 N/mm$^2$. The gel did not maintain the former shape after the 50% compression.

COMPARATIVE EXAMPLE 2 OF THE FOURTH EMBODIMENT 20 g of commercial CMC ( the degree of etherification is 1.36 and the viscosity of 1 weight % aqueous solution is 1640 mPa·s at 25° C., made by Daicel Chemical Industries Ltd.) was added to 80 g of 0.75 mol/l of hydrochloric acid, mixed at 2000 rpm for 20 minutes by using super-mixer Awatori-Rentaro made of THINKY Corporation, and then defoamed for 10 minutes. The sample paste was expanded to 10 mm in thickness, and pierced with the cork borer. After the pierced sample had been preserved for five days at 30° C., the physical properties were measured with small type desk-top tester EZTest made by Shimadzu Corporation. The breaking strength and compression modulus of the gel were measured by compressing the gel with the compression jig made of Teflon (registered trademark) of 50 mm in diameter. The breaking strength was 1.22 N/mm$^2$ and the compression modulus was 0.116 N/mm$^2$. Moreover, the maximum stress when the gel was compressed to 50% of its original thickness was measured with this tester. The maximum stress was 0.13 N/mm$^2$. The tension test was carried out with small type desk-top tester EZTest made by Shimadzu Corporation by using a strip specimen of 0.5 mm in thickness and 8 mm in width. The breaking strength was 3.63N and the Young's modulus was 1.16N.

Figure 13:
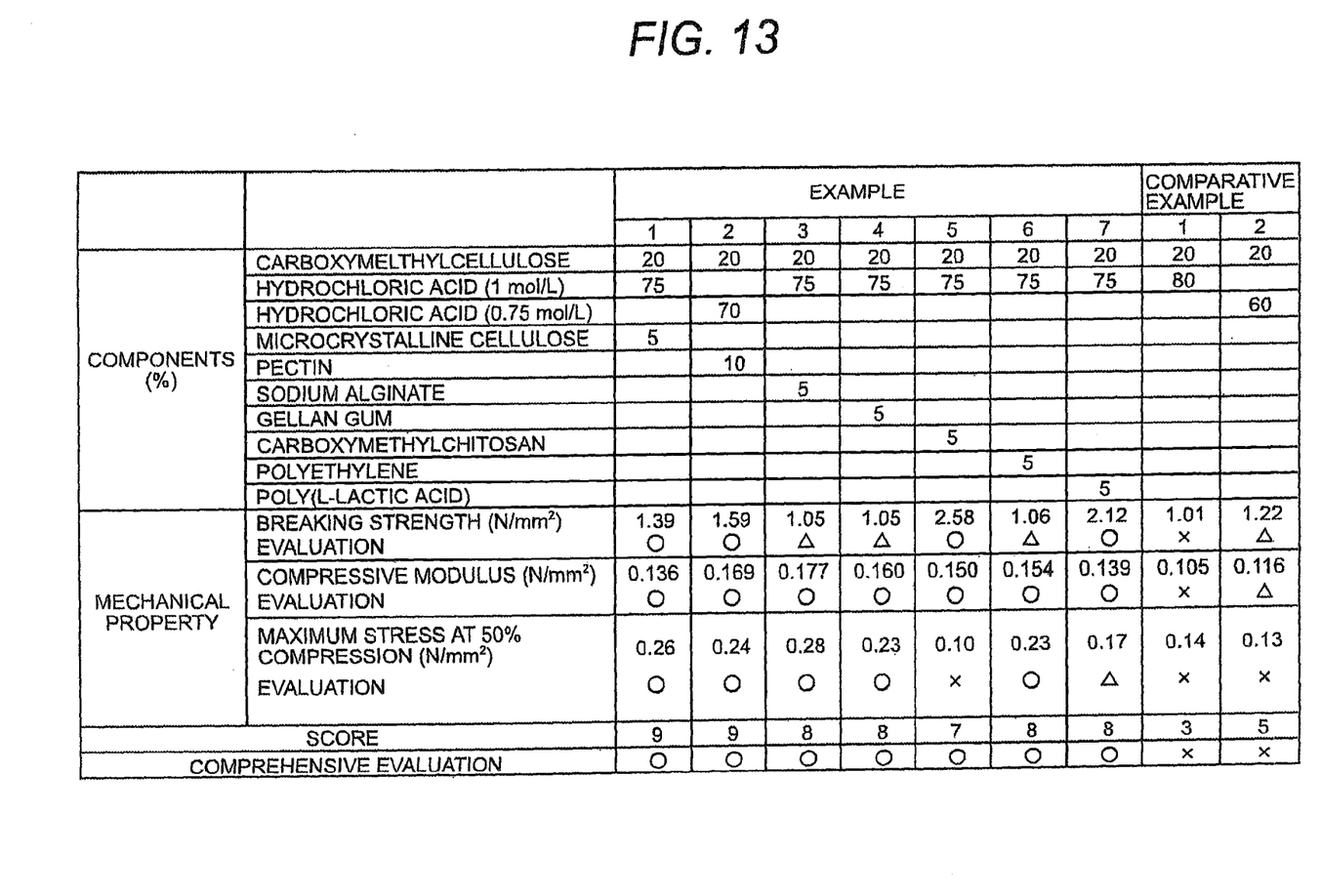
FIG. 13 is a view showing the characteristics of the gel formed according to the gel preparation method shown in FIG. 12.

The above-mentioned result is shown in FIG. 13. FIG. 13 is a view showing the characteristics of the gel prepared according to the gel preparation method shown in FIG. 12. In FIG. 13, the breaking strength less than 1.05 (N/mm$^2$) was evaluated as "×" (one point), and 1.05-1.30 (N/mm$^2$) was evaluated as "Δ" (two points), and more than 1.30 (N/mm$^2$) was evaluated as "○" (three points). The compression modulus less than 0.110 (N/mm$^2$) was evaluated as "×" (one point), and 0.110-0.130 (N/mm$^2$) was evaluated as "Δ" (two points), and more than 0.130 (N/mm$^2$) was evaluated as "○" (three points). The maximum stress at 50% compression less than 0.15 (N/mm$^2$) was evaluated as "×" (one point), and 0.15-0.20 (N/mm$^2$) was evaluated as "Δ" (two points), and more than 0.20 (N/mm$^2$) was evaluated as "○" (three points).

According to the fourth embodiment of the present invention, it is possible to form a gel inexpensively and easily because expensive radiation equipment is not required. In addition, the gel of high strength can be formed differently from a gel preparation method in which only acid is used. The obtained gel is one of an environmentally friendly type gels, because the raw material is derived from plant.

Such a CMC gel can be used in wide-ranging fields such as agriculture, industry, medical treatment, and foods, and preferably for domestic animal waste treatment agents, waste water treatment agents, deodorization materials, catalyst carriers, energy-absorption materials, and medical applications for sticking materials and patty materials, etc.

What is claimed is:

1. A method of preparing a gel from carboxymethyl cellulose alkali metal salt, which includes a gelling step of contacting said carboxymethyl cellulose alkali metal salt with acid or acid solution so as to form a gel or increase the gel fraction in the absence of a cross-linking agent and a polyvalent metal salt and without irradiation, wherein the concentration of said carboxymethyl cellulose alkali metal salt in the gel formed by contact with said acid or acid solution is in the range of 2.5 to 40 weight % of the total weight of initial materials.

2. A method according to claim 1, wherein, after said gelling step, the gel is subjected to ionizing radiation.

3. A method according to claim 1, wherein, before said gelling step, the carboxymethyl cellulose alkali metal salt is subject to ionizing radiation.

4. A method according to claim 1, wherein the gel produced is a physical gel formed by aggregation of molecular chains without introduction of new covalent bonds.

5. A method according to claim 1, wherein, prior to contact with the acid or acid solution, the carboxymethyl cellulose alkali metal salt and water are mixed to form a paste, and the paste is then immersed in the acid or acid solution.

6. A method according to claim 1, wherein in the gelling step, the carboxymethyl cellulose alkali metal salt is mixed with the acid or acid solution and an organic reinforcement compound.

7. A method according to claim 6, wherein the content ratio of carboxymethyl cellulose alkali metal salt is 2.5% to 40% to total weight of the mixture which contains carboxymethyl cellulose alkali metal salt, acid or acid solution and organic reinforcement compound.

8. A method of preparing a gel from carboxymethyl cellulose alkali metal salt, which includes a gelling step of contacting said carboxymethyl cellulose alkali metal salt with acid or acid solution so as to form a gel or increase the gel fraction in the absence of a cross-linking agent;
    wherein in the gelling step, the carboxymethyl cellulose alkali metal salt is mixed with the acid or acid solution and an organic reinforcement compound;
    wherein the content ratio of carboxymethyl cellulose alkali metal salt is 2.5% to 40% to total weight of the mixture which contains carboxymethyl cellulose alkali metal salt, acid or acid solution and organic reinforcement compound; and
    wherein hydrochloric acid or hydrochloric acid solution is added to the carboxymethyl cellulose alkali metal salt as the acid or the acid solution.

9. A method of preparing a gel from carboxymethyl cellulose alkali metal salt, which includes a gelling step of contacting said carboxymethyl cellulose alkali metal salt with acid or acid solution so as to form a gel or increase the gel fraction in the absence of a cross-linking agent;
    wherein in the gelling step, the carboxymethyl cellulose alkali metal salt is mixed with the acid or acid solution and an organic reinforcement compound;
    wherein the content ratio of carboxymethyl cellulose alkali metal salt is 2.5% to 40% to total weight of the mixture which contains carboxymethyl cellulose alkali metal salt, acid or acid solution and organic reinforcement compound; and
    wherein the organic reinforcement compound is one or more organic compound selected from microcrystalline cellulose, pectin, alginic acid, gellan gum, carboxymethyl chitosan, polyethylene, and polylactic acid.

10. A gel which contains carboxymethyl cellulose alkali metal salt as a principal ingredient, acid or acid solution and an organic reinforcement compound, and which is a physical gel without cross-linking covalent bonds and in the absence of a polyvalent metal salt.

11. A gel according to claim 10, wherein the content ratio of carboxymethyl cellulose alkali metal salt is 2.5% to 40% to total weight of the mixture which contains carboxymethyl cellulose alkali metal salt, acid or acid solution and organic reinforcement compound.

12. A gel which contains carboxymethyl cellulose alkali metal salt as a principal ingredient, acid or acid solution and an organic reinforcement compound, and which is a physical gel without cross-linking covalent bonds;
    wherein the content ratio of carboxymethyl cellulose alkali metal salt is 2.5% to 40% to total weight of the mixture which contains carboxymethyl cellulose alkali metal salt, acid or acid solution and organic reinforcement compound; and
    wherein the acid or acid solution is hydrochloric acid or hydrochloric acid solution.

13. A gel which contains carboxymethyl cellulose alkali metal salt as a principal ingredient, acid or acid solution and an organic reinforcement compound, and which is a physical gel without cross-linking covalent bonds;
    wherein the organic reinforcement compound is one or more organic compounds selected from microcrystalline cellulose, pectin, alginic acid, gellan gum, carboxymethyl chitosan, polyethylene, and polylactic acid.

14. A gel which contains carboxymethyl cellulose alkali metal salt and acid or acid solution, and which is a physical gel without cross-linking covalent bonds and in the absence of a polyvalent metal salt.

15. A gel according to claim 14, wherein the weight of carboxymethyl cellulose alkali metal salt is within the range of 2.5 to 40% by weight of the total weight of initial materials.

16. A method according to claim 1, wherein a pH of said acid solution is in the range of 0 to 2.5.

* * * * *